United States Patent [19]

Brahm

[11] 4,077,301

[45] Mar. 7, 1978

[54] APPARATUS FOR CUTTING EXPANDED FOAM BLOCKS TO PROVIDE A PREDETERMINED SURFACE CONFIGURATION THEREON

[76] Inventor: Harry Brahm, P.O. Box 372 Riverside Station, Miami, Fla. 33135

[21] Appl. No.: 691,141

[22] Filed: May 28, 1976

[51] Int. Cl.² ............................ B23C 1/16; B26F 3/12
[52] U.S. Cl. ...................................... 90/13.2; 83/171; 83/565; 83/581.1; 83/651.1
[58] Field of Search ................... 83/171, 16, 1, 4, 565, 83/651.1, 581.1; 90/13.2

[56] References Cited

U.S. PATENT DOCUMENTS

| | | | |
|---|---|---|---|
| 3,540,336 | 11/1970 | Kelsey | 83/171 |
| 3,757,617 | 9/1973 | Fabbri | 83/1 |
| 3,800,650 | 4/1974 | Schroder | 83/565 X |
| 3,968,711 | 7/1976 | Wilson | 83/171 |

*Primary Examiner*—Frank T. Yost
*Attorney, Agent, or Firm*—Erwin M. Barnett

[57] ABSTRACT

In the manufacture of modular chairs, couches and lounges, an apparatus shapes a block of an expanded plastic foam into a predetermined surface configuration by cutting by means of a hot wire tautly mounted on a frame for two dimensional manually guided movement defined by the periphery of a template. A rotating spiral saw replaces the hot wire as an alternate cutting device.

8 Claims, 7 Drawing Figures

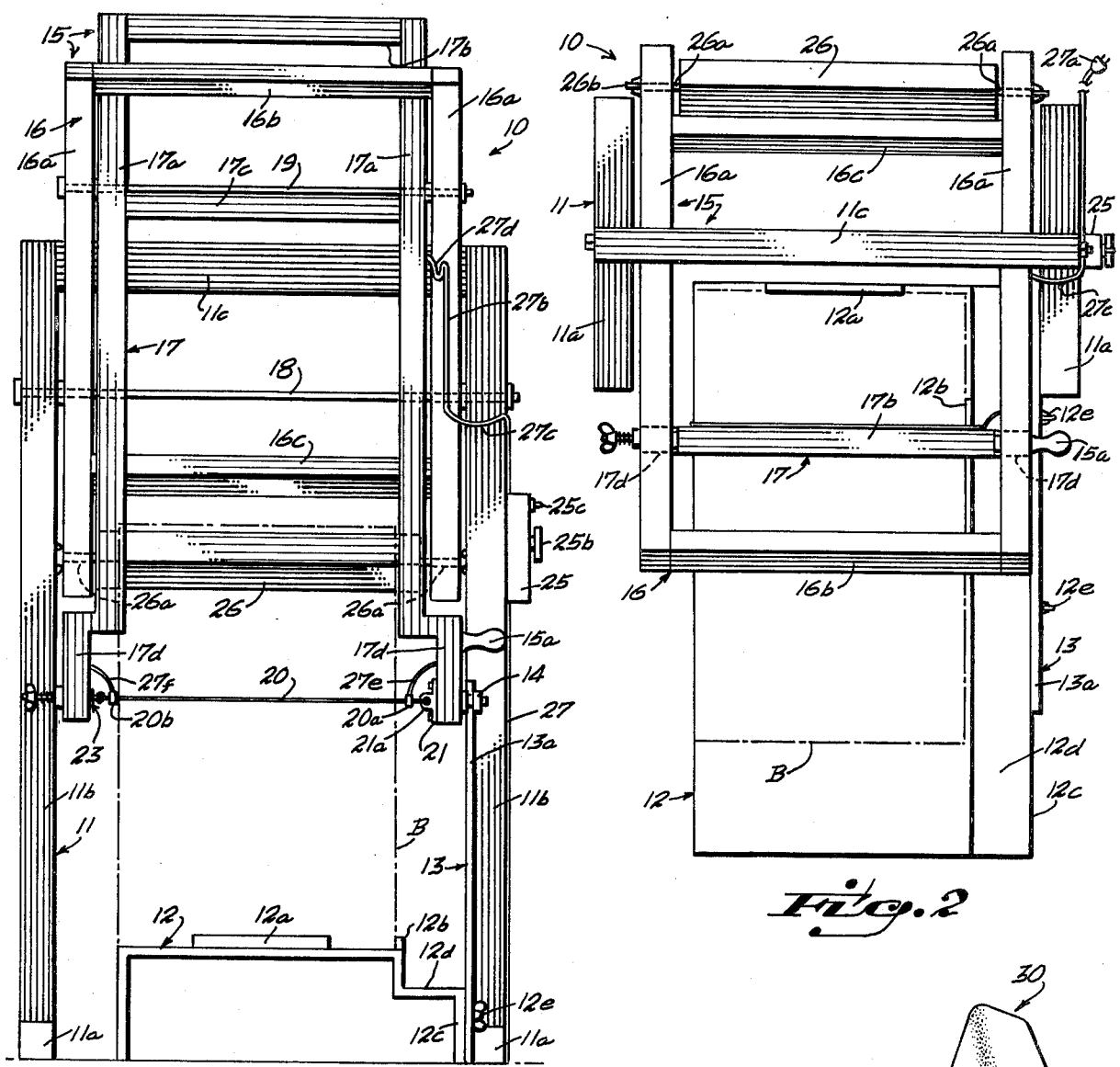
Fig.1
Fig.2
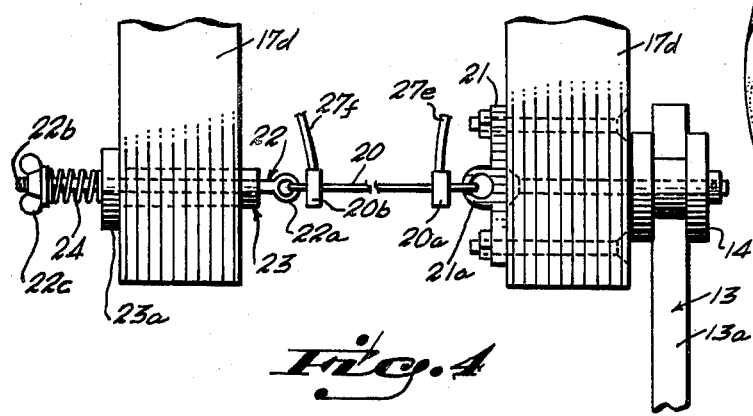
Fig.4
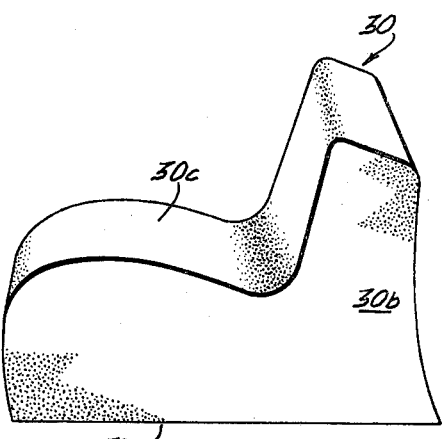
Fig.6

APPARATUS FOR CUTTING EXPANDED FOAM BLOCKS TO PROVIDE A PREDETERMINED SURFACE CONFIGURATION THEREON

BACKGROUND OF THE INVENTION

1. Field of the Invention

The invention relates generally to manually operable devices for surface contouring blocks of expanded plastic foam in the manufacture of modular furniture and more particularly is directed to devices in which the cutting means comprises a taut straight line hot wire or spiral saw blade mounted for two dimensional movement defining a prescribed contour.

2. Description of the Prior Art

In the manufacture of modular furniture, such as, chairs, couches, lounges, and the like, the upholstery, with the exception of the fabric covering and the base, comprises an expanded plastic foam module having various surfaces thereof contoured to the desired configuration. Such modules, which replace springs, webbing, cushions and the like, have been manufactured by the relatively costly molding process whereby each module is expanded in its own specifically contoured mold. This invention eliminates the need for costly molds and permits readily available square or oblong blocks of expanded plastic foam to be fashioned to any desired contour. A modular chair of this manufacture is shown in my copending design application Ser. No. 661,175 filed Feb. 25, 1976.

SUMMARY OF THE INVENTION

Among the objects of the invention is to provide an apparatus of the character described having few and simple parts for manufacture and assembly at relatively low cost, which apparatus shall be capable, with a minimum of skill, of precisely cutting a block of expanded plastic foam to any desired surface contour.

The invention contemplates a platform which supports the block of expanded foam to be shaped in operative position with respect to an interchangeable template having a periphery outlining the pattern of the surface to be cut and with respect to a movable frame which mounts a wire-like cutter extending across an open end thereof. A stationary support suspends the frame to dispose the cutter on an axis transverse the length of the block, that is, widthwise thereof. The frame suspension includes an intermediate counterbalanced frame pivoted to the stationary support on a second axis above and parallel to the cutter axis, the frame in turn being pivoted on the intermediate frame on a third axis spaced from and parallel to the other two axes. The pivoting of the frame and intermediate frame on the second and third axes permits movement of the cutter through the block in both vertical and horizontally longitudinal directions. Guide means, such as a roller, is carried by the frame in axial alignment with the cutter axis and is located to ride on the patterned periphery of the template whereby the frame is manually manipulated by handgrasping a handle conveniently mounted on the frame enabling the operator to guide the roller around the template pattern and simultaneously move the cutter through the foam block. In one embodiment an electrically heated wire element serves as the cutter, which when energized from a power source provides heat sufficient to melt the foam material in contact with the wire to effect the cutting as the wire is guided through the block. In another embodiment the cutter takes the form of a spiral saw which is axially rotated by an electric motor mounted on the frame.

BRIEF DESCRIPTION OF THE DRAWINGS

FIG. 1 is a front elevational view of the apparatus embodying the invention, a block of expanded foam to be cut being indicated in broken lines on the platform.

FIGS. 2 and 3 are top plan and right side elevational views, respectively, of the apparatus shown in FIG. 1.

FIG. 4 is an enlarged fragmentary view showing details of the lower end of the horizontal swing imparting frame and cutter mounting means shown in FIG. 1, the guide roller being in engagement with the patterned periphery of the template.

FIG. 6 is a perspective view of a plastic foam module cut from a block by the apparatus embodying the invention.

DESCRIPTION OF THE PREFERRED EMBODIMENTS

Referring in detail to the drawings, 10 generally denotes an apparatus embodying the invention having a stationary support 11 which pivotally suspends a movable frame assembly 15 mounting horizontally disposed cutter 20 for vertical and longitudinal movement through a block B of an expanded plastic foam material positioned on horizontal platform 12.

Figure 5:
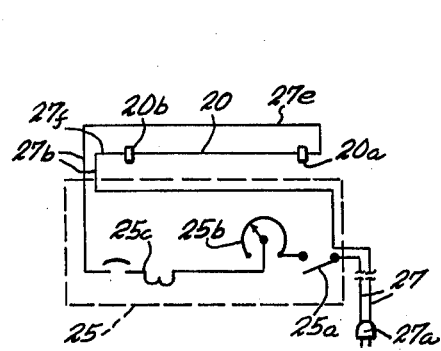
FIG. 5 is a wiring diagram of the electric circuit for the electrically heated wire cutter shown in FIG. 4.
Figure 3:
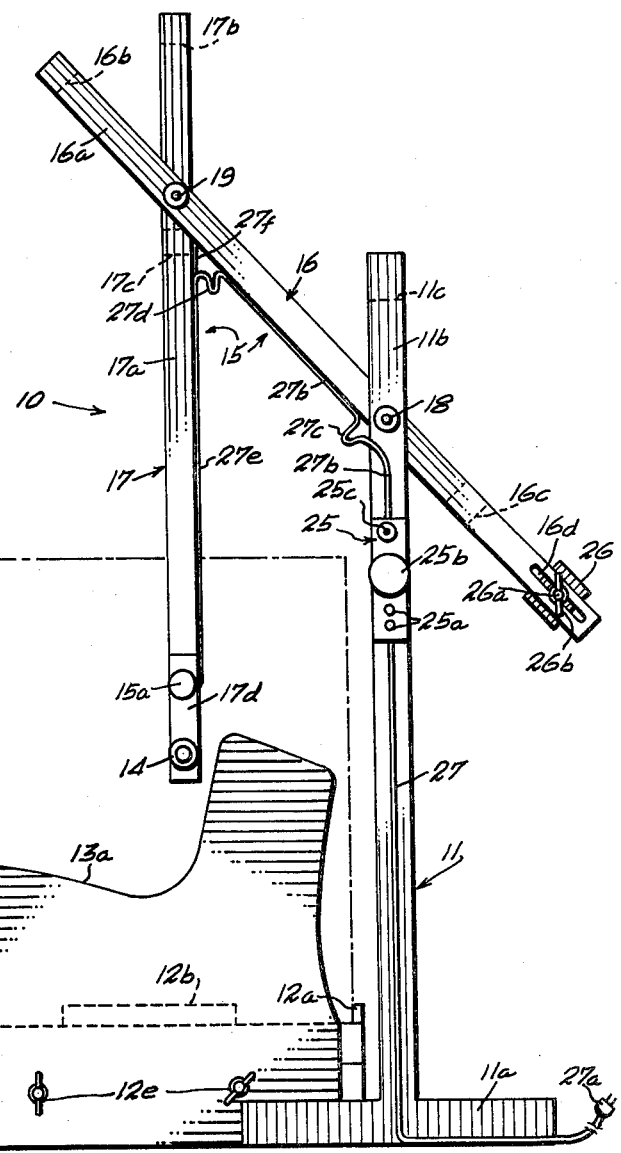

Stationary support 11 is seen in FIGS. 1, 2 and 3 as formed of metal tubing comprising a pair of spaced base members 11a which support a pair of upright members 11b interconnected at their upper ends by a transverse member 11c. Members 11a, 11b and 11c may be welded or otherwise fastened together into a rigid structure. Platform 12 is located between and forwardly of upright members 11b and has suitable locating means for block B, such as, transverse and longitudinal upstanding flanges 12a and 12b shown as extending along a midportion of the rear end and right side, respectively, thereof. Flange 12b aligns and spaces block B with respect to a template 13 which is interchangeably supported to upstand against a low right sidewall 12c of platform 12 by any suitable means, such as, a pair of spaced bolts and wing nuts 12e. A downstep or depression 12d from the supporting surface of platform 12 to the top of sidewall 12c provides clearance for the supporting structure of cutter 20 at the right end thereof.

Movable frame assembly 15 comprises vertical swing imparting frame 16 and horizontal swing imparting frame and mounting means 17 for cutter 20. Frames 16 and 17 may be formed of metal tubing similar to support 11 but smaller in cross-section. Frame 16 may include a pair of lateral members 16a interconnected at an upper end by front transverse member 16b and inwardly of the lower end thereof by rear transverse member 16c and is sized to fit between upright members 11b for pivoting thereto at a midportion of members 16a on pivot bar 18. The lower end portions of lateral members 16a which project beyond rear transverse member 16c may be formed to adjustably mount a counter-weight 26 for balancing assembly 15 on pivot bar 18. As here shown, a pair of threaded stud shafts 26a project from opposite ends of counter-weight 26 and extend through elongated slots 16d formed in members 16a engage locking wing nuts 26b.

Horizontal swing imparting frame and cutter mounting means 17 comprises a pair of lateral members 17a interconnected at an upper end thereof by transverse member 17b and at a midportion thereof by transverse bracing member 17c. Frame 17 is shown sized to fit between lateral members 16a and to be pivotally suspended therefrom at a midportion of members 17a on pivot bar 19 located a spaced distance from pivot bar 18 upwardly along members 16a. Separate individual pivot pins for each side of the frames may be alternatively employed in place of pivot bars 18 and 19.

Cutter 20, being a nichrome wire electric heating element, is shown in FIGS. 1 and 4 to extend between the free lower ends of lateral members 17a, which, to accommodate a block B of maximum width for the spacing of upright members 11b, may be provided with laterally offset end portions 17d. Any suitable means may be utilized to mount cutter 20 in an electric circuit and in a taut condition under tension to absorb any lengthening due to expansion when heated. The opposite ends of cutter 20 are formed with loops, one of which engages an eyelet 21a of an insulator 21 which is bolted to the right laterally offset end portion 17d of frame 17 to provide a rigid attachment thereto. The opposite end loop of cutter 20 engages an eyelet end 22a of a bolt 22 which slidably passes through the bore of a liner plug insulator 23 mounted in an opening in the left laterally offset end portion 17d to electrically isolate bolt 22 and cutter 20 therefrom. The threaded end 22b of bolt 22 projecting from insulator 23 carries a coiled compression spring 24 which provides the take-up tension means allowing for said expansion and contraction of cutter 20 caused by temperature variation by acting between flange 23a of insulator 23 and adjustable wing nut 22c to keep cutter 20 taut.

A handle 15a, preferably made of wood, plastic or other electric insulating material, is mounted for accessibility to project laterally from right offset end portion 17d and may be located above a grooved roller 14 mounted thereon for rotation in axial alignment with cutter 20 and in vertical alignment with template 13 for riding on and following the patterned priphery 13a thereof.

Conrolled electric energy is supplied to cutter 20 through suitable electric components and wiring from any conventional power source. As seen in FIGS. 1 to 5, inclusive, a control box 25 is located on right upright member 11b of stationary support 11 convenient to the operator of apparatus 10. An input dual lead wire 27 extends upwardly along the lower portion of member 11b supplying power to control box 25 from a direct installation to the power source, or wire 27 may terminate, as shown, in a plug 27a for connecting to any conventional electric outlet. An on-off switch 25a, rheostat 25b and circuit breaker 25c may be housed in control box 25 or may be provided separately and at different locations in the well understood manner. Any appropriate wiring to cutter 20 is intended, and a form is here shown as dual lead wire 27b extending upwardly along member 11b to the approximate level of pivot bar 18 and looping at 27c over to right lateral member 16a of frame 16 and extending therealong towards pivot bar 19 and then looping at 27d to right lateral member 17a of frame 17 and there dividing into single lead wires. One single lead wire 27e passes down along right lateral member 17a to be electrically attached to the right end of cutter 20 by connector 20a and the other single lead wire 27f passes along transverse bracing member 17c and down left lateral member 17a to be attached to the left end of cutter 20 by connector 20b. As will be clear from FIG. 5, switch 25a, rheostat 25b and circuit breaker 25c are all in series circuit with cutter 20 and serve, respectively, to supply and cut-off electric power, to vary the voltage and thus, the temperature of cutter 20, and to protect the circuit from overloading. Platform 12 and upstanding flanges 12a and 12b are formed either entirely of, or at least surfaced with a non-conductor of electricity, such as, wood plastic or the like material, to avoid short circuiting when cutter 20 is brought in contact therewith during the intended operation of apparatus 10.

Apparatus 10, though applicable to the cutting of expanded plastic foam of various types into three dimensional objects of a wide range of sizes and shapes to serve many different uses and applications, is hereinafter described in its operation in fashioning integral supportive structures for upholstered furniture shown in FIG. 6 as module 30. Thus, block B, which is expanded high density polyurethane foam shaped as a rectangular prism and sized to provide two modules 30 to be cut therefrom in opposite interfitted relation to conserve material in the well understood manner, is placed on platform 12 against upstanding flanges 12a and 12b, as indicated in broken lines in FIGS. 1, 2 and 3. A template 13, having its periphery 13a outlining the desired contour to be cut, is selected and affixed to sidewall 12c by bolts and wing nuts 12e. Movable frame assembly 15, having been balanced on pivot bar 18 by adjusting the position of counter-weight 26 in slots 26d, will float cutter 20 so that a minimum force is required to be applied to handle 15a for smooth and easy manipulation. Electric current is then supplied to cutter 20 by closing switch 25a and rheostat 25b is adjusted to heat cutter 20 to a red glow in which condition it is ready for use.

The cutting of module 30 from the bottom half of block B may be commenced by an initial cut from either the front or rear end thereof, that is, the right or left side, respectively, shown in FIG. 3, toward the corresponding bottom end of template periphery 13a until roller 14 engages the latter as a starting point. Roller 14 is then slowly guided along template periphery 13a to the opposite end thereof simultaneously cutting contoured surface 30c through block B, the smooth two dimensional movement of cutter 20 being provided by a combination of the up and down swinging of the forwardly projecting portion of frame 16 on pivot 18 to raise and lower pivot 19 and the side to side or pendulum-like swinging of frame 17 on pivot 19, as will be clear from FIG. 3. When cutter 20 is brought into contact with block B, heat dissipation to melt the foam material in effecting the cutting may require adjustment of rheostat 25b to restore cutter 20 to the melting point temperature. A final cut away from the opposite end of template periphery 13a to the exterior of block B frees cutter 20 from engagement therewith permitting module 30 to be removed from block B and the uncut half of the latter placed in an inverted and reversed position against flanges 12a and 12b for cutting a second module 30 therefrom in the same manner.

As will be clear from FIG. 6, three sides have been cut by apparatus 10 forming contoured surface 30c as a shaped low front side, a chair seat, a chair back and a shaped rear side for module 30. The other three uncut sides form a flat bottom 30a and two opposite flat sides 30b. When mounted on a frame base and covered with fabric, module 30 provides the entire interior structure of a finished piece of upholstered furniture which will serve individually as an easy chair, in an adjacent pair as a love seat, or in an adjacent triplet as an attractive yet inexpensive sofa.

Figure 7:
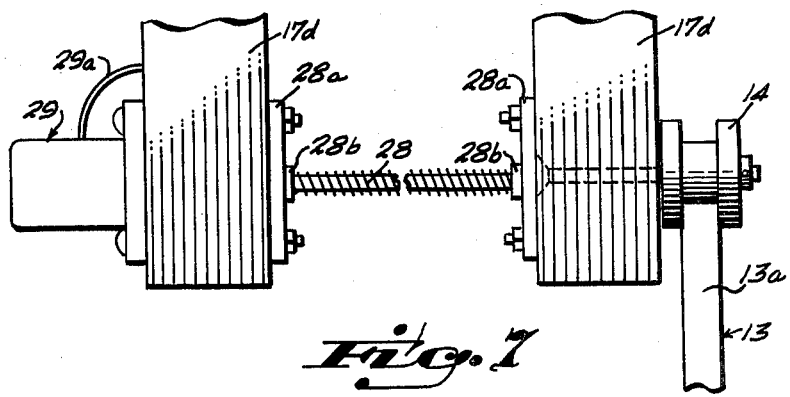
FIG. 7 is an enlarged fragmentary view similar to FIG. 4 but showing a motor driven spiral saw and its mounting as an alternative form of cutter.

An alternative form of cutter 28 is shown in FIG. 7 as a spiral saw journaled for rotation in thrust bearings 28b carried by bearing blocks 28a which are mounted on the laterally offset end portions 17d to position cutter 28 in place of cutter 20. Thrust bearings 28b prevent axial movement of spiral saw cutter 28 with respect to frame end portions 17d to resist sagging in a midportion thereof and to maintain cutter 28 in a taut condition while driven by electric motor 29 to which it is suitably connected for axial rotation. Electric motor 29 has suitable wiring 29a extending along parts of movable frame assembly 15 and stationary support 11 to a power source and may have an electric switch interposed in a manner comparable to the wiring for cutter 20. With cutter 28 being rotated by motor 29, apparatus 10 will function in a manner similar to that hereinbefore described for cutter 20, differing only in that the cutting through block B is effected by a sawing action rather than the melting action of cutter 20.

The apparatus for cutting expanded foam blocks to provide predetermined surface contour thereon is seen to achieve the several objects of the invention and to be well adapted to meet conditions of practical use. As various possible embodiments might be made of this invention, and as various changes might be made in the disclosed construction and modification, it is to be understood that all matter herein set forth or shown in the accompanying drawings are to be interpreted as illustrative and not in a limiting sense.

What is claimed is:

1. An apparatus comprising a stationary support, a movable frame assembly suspended from said support, a taut wire-like cutter supported at opposite ends by said movable frame assembly for vertical and horizontal movement, a changeable template having a periphery formed with a predetermined contour lying in a vertical plane and extending horizontally in parallel relation to said movement of said cutter, follower means carried by said frame assembly to engage said template periphery for guiding the cutter along said predetermined contour, a platform located beneath said movable frame assembly for supporting a block of expanded plastic foam to be cut by said cutter, means for locating said block on said platform with respect to said cutter and template in position for cutting a surface therein having said predetermined contour, said movable frame assembly includng a first frame pivoted at a midportion thereof to said stationary support on a first horizontal axis, said first frame being normally inclined and having an upper portion projecting above said platform, a second frame pivotally suspended from said first frame upper portion on a second horizontal axis spaced from said first axis, said second frame having an open bottom end across which said cutter extends for said opposite end support thereby, said vertical and horizontal movement of said cutter by said movable frame being accomplished by pivoting of said first frame to vertically raise and lower said second axis, second frame and cutter, and the pivoting of said second frame to swing said cutter back and forth horizontally, and electric power means for energizing said cutter to effect said cutting.

2. The apparatus defined in claim 1 in which said cutter is a heated wire and said electric power means provides current to heat the wire to a temperature sufficient to melt the plastic foam in contact therewith to effect said cutting.

3. The apparatus defined in claim 2 in which said wire is mounted under spring tension to take up slack and retain a taut condition during expansion due to heating.

4. The apparatus defined in claim 2 in which said electric power means includes a rheostat for adjusting the power supplied to said wire to compensate for heat dissipation in said melting of the plastic foam.

5. The apparatus defined in claim 1 in which said first frame mounts an adjustable counter-weight on a lower end portion thereof for balancing said movable frame assembly with respect to said first axis.

6. The apparatus defined in claim 1 in which said follower means is a roller mounted on said second frame for rotation in axial alignment with said cutter, and a handle is mounted on said second frame for manually effecting said guiding.

7. The apparatus defined in claim 1, in which said second frame open bottom end mounts a pair of electric insulators on opposite sides thereof as said cutter end support, said cutter being a heated wire extending between said insulators, one of said insulators having an opening in axial alignment with said cutter, and a bolt slidingly extending through said insulator opening, one end of said bolt being connected to one end of said cutter, the opposite end of the bolt being threaded and coaxially mounting a coiled compression spring and a wing nut, said spring acting between the insulator and wing nut for adjustable application of spring tension to the cutter to take up slack and retain a taut condition during expansion due to heating.

8. The apparatus defined in claim 1 in which said cutter is a spiral saw blade and said electric power means is an electric motor connected to rotate the blade to effect said cutting.

* * * * *